United States Patent [19]

Mihara et al.

[11] Patent Number: 5,646,800

[45] Date of Patent: *Jul. 8, 1997

[54] MAGNETIC DISC DEVICE HAVING A LEAD WIRE RETAINING GROOVE IN THE ACTUATOR ARM

[75] Inventors: Takahisa Mihara, Sagamihara; Shoji Samma, Yokohama; Sigeo Saito, Sagamihara, all of Japan

[73] Assignee: Fujitsu Limited, Kawasaki, Japan

[*] Notice: The term of this patent shall not extend beyond the expiration date of Pat. No. 5,418,666.

[21] Appl. No.: 368,640

[22] Filed: Jan. 4, 1995

Related U.S. Application Data

[63] Continuation of Ser. No. 197,541, Feb. 17, 1994, Pat. No. 5,418,666, which is a continuation of Ser. No. 68,610, May 27, 1993, abandoned, which is a continuation of Ser. No. 748,504, Aug. 22, 1991, abandoned, which is a division of Ser. No. 463,838, Jan. 11, 1990, Pat. No. 5,060,100, which is a continuation of Ser. No. 58,148, Jun. 4, 1987, abandoned.

[30] Foreign Application Priority Data

Jun. 4, 1986 [JP] Japan ................ 61-085144
Jul. 18, 1986 [JP] Japan ................ 61-109459
Jul. 19, 1986 [JP] Japan ................ 61-110030

[51] Int. Cl.$^6$ ............................ G11B 5/012; G11B 5/48
[52] U.S. Cl. ............................ 360/97.01; 360/104
[58] Field of Search .................. 360/104–106, 360/97.01

[56] References Cited

U.S. PATENT DOCUMENTS

| | | | |
|---|---|---|---|
| Re. 32,702 | 6/1988 | Hasler et al. | 360/97 |
| 3,931,641 | 1/1976 | Watrous | 360/103 |
| 4,161,004 | 7/1979 | Dalziel | 360/106 |
| 4,194,225 | 3/1980 | Hasler | 360/97 |
| 4,196,456 | 4/1980 | Manzke | 360/106 |
| 4,352,134 | 9/1982 | Burns | 360/103 X |
| 4,367,502 | 1/1983 | Iftikar | 360/98 |
| 4,415,821 | 11/1983 | Wedman | 360/106 X |
| 4,422,115 | 12/1983 | Spash | 360/104 |
| 4,568,988 | 2/1986 | McGinlay et al. | 360/77 |

(List continued on next page.)

FOREIGN PATENT DOCUMENTS

| | | |
|---|---|---|
| 0 060 358 | 9/1985 | European Pat. Off. . |
| 0 157 017 | 10/1985 | European Pat. Off. . |
| 0 253 626 | 1/1988 | European Pat. Off. . |
| 2 420 809 | 10/1979 | France . |
| 51-049012 | 4/1976 | Japan . |
| 57-191872 | 10/1982 | Japan . |
| 60-035319 | 6/1985 | Japan . |
| 60-035320 | 6/1985 | Japan . |

OTHER PUBLICATIONS

Klitz, Gerald H., "Less can be more with half–height disk drives," *Mini–Micro Systems,* Feb. 16, 1983, No. 2, Denver, CO, pp. 211–213.

Nayak, J.H., "Head Suspension Assemblies with Internally Preloaded Dimple," *IBM Technical Disclosure Bulletin,* vol. 26, No. 6, Nov. 1983, pp. 2920–2921.

*Nikkei Electronics,* 1985 Sep. 23, pp. 153–172.

*Patent Abstracts of Japan,* vol. 9, No. 299 (P–408)[2022], Nov. 27, 1985 & JP–A–60–133569 (Hitachi Seisakusho K.K.), Jul. 16, 1985.

*Patent Abstracts of Japan,* vol. 9, No. 308 (P–410)[2031], Dec. 4, 1985 & JP–A–60–138789 (Toshiba K.K.), Jul. 23, 1985.

*Primary Examiner*—A. J. Heinz
*Attorney, Agent, or Firm*—Staas & Halsey

[57] ABSTRACT

A magnetic disc device of half-height type comprising: a base; four magnetic discs disposed one above the other on the base; five head arms rotatable about a pivot for seeking motion on both surfaces of each magnetic disc; eight magnetic heads each attached to an end of the head arm through springs facing a surface of each disc; a rotational drive unit for swinging the head arms; a main printed circuit board disposed on a rear side of the base; and, a cover which covers an upper surface of the base.

33 Claims, 11 Drawing Sheets

U.S. PATENT DOCUMENTS

| | | | |
|---|---|---|---|
| 4,647,997 | 3/1987 | Westwood | 360/98 X |
| 4,700,250 | 10/1987 | Kuriyama | 360/104 |
| 4,707,754 | 11/1987 | Patel | 360/106 |
| 4,716,478 | 12/1987 | Walsh | 360/106 X |
| 4,739,429 | 4/1988 | Seki | 360/104 |
| 4,739,430 | 4/1988 | Manzke | 360/106 |
| 4,805,055 | 2/1989 | Wright | 360/106 |
| 5,023,733 | 6/1991 | Koga et al. | 360/99.08 |

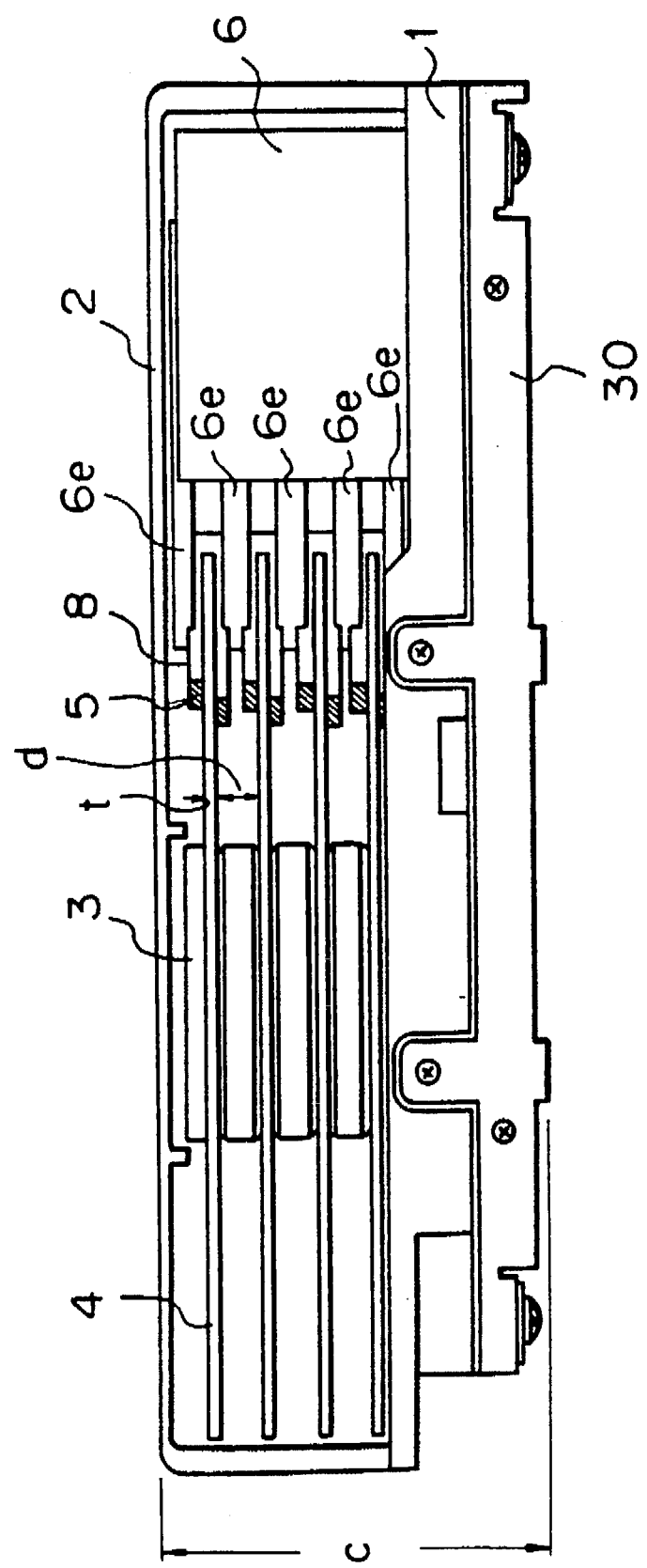

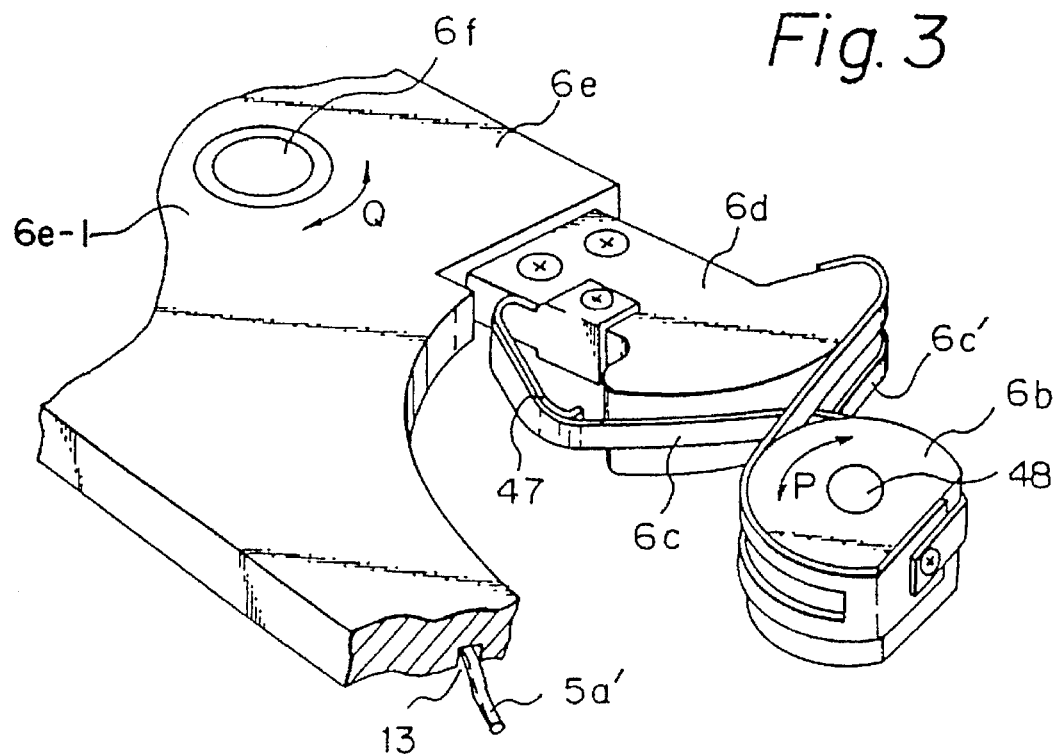
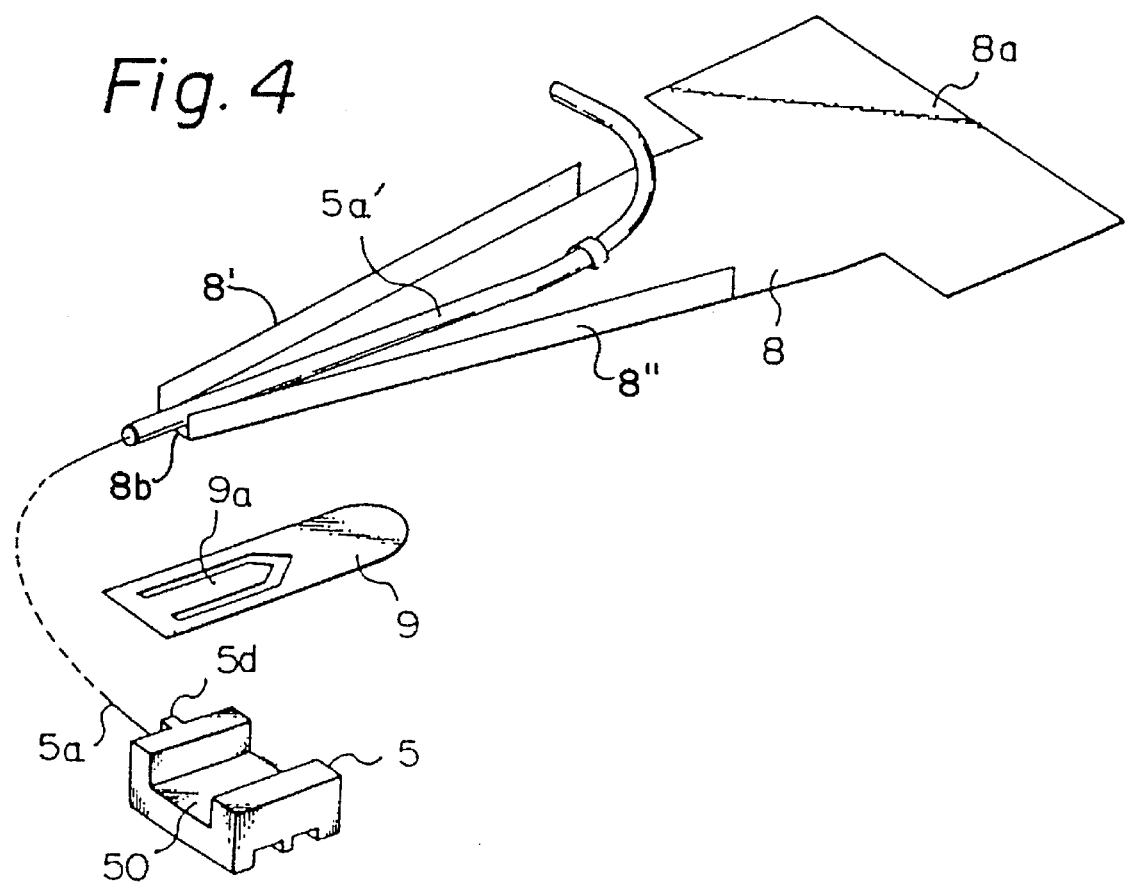

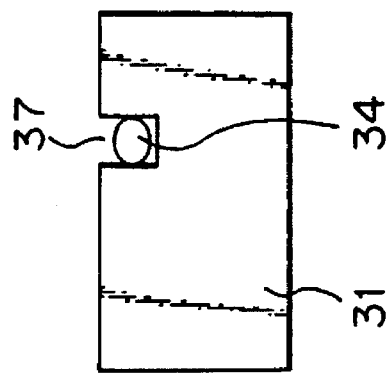
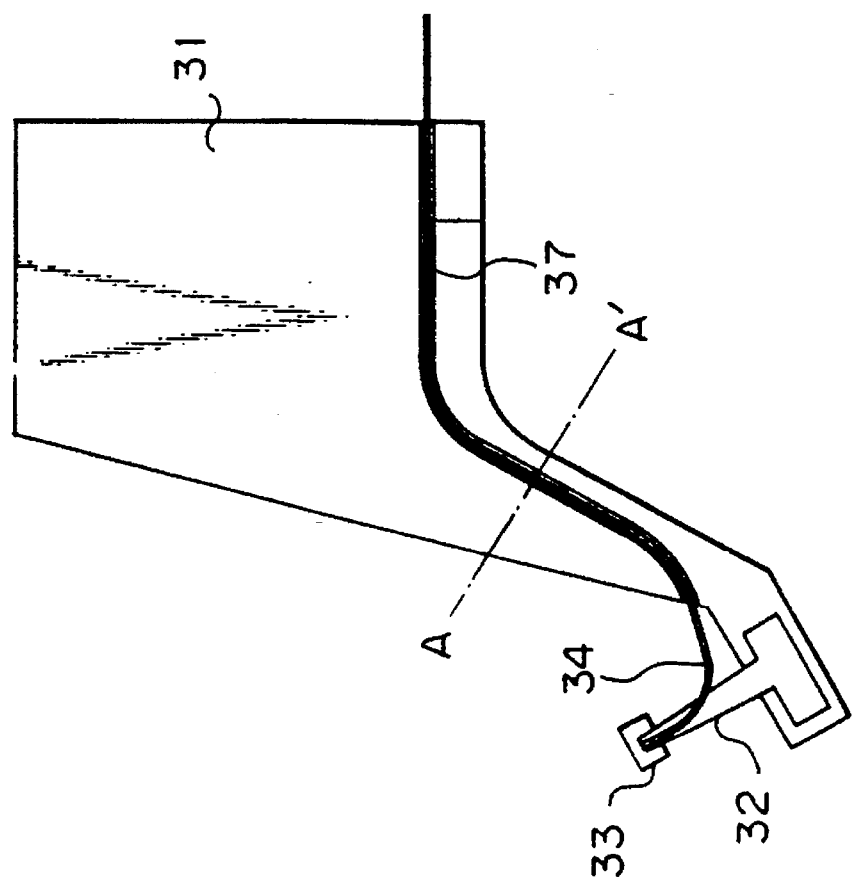
Fig. 8a
Fig. 8b

MAGNETIC DISC DEVICE HAVING A LEAD WIRE RETAINING GROOVE IN THE ACTUATOR ARM

This application is a continuation of application Ser. No. 08/197,541, filed Feb. 17, 1994, now U.S. Pat. No. 5,418,666, which is a continuation of application Ser. No. 08/068,610, filed May 27, 1993, now abandoned, which is a continuation of application Ser. No. 07/748,504, filed Aug. 22, 1991, now abandoned, which is a division of application Ser. No. 07/463,838, filed Jan. 11, 1990, now U.S. Pat. No. 5,060,100, issued Oct. 22, 1991, which is a continuation of application Ser. No. 07/058,148, filed Jun. 4, 1987, now abandoned.

BACKGROUND OF THE INVENTION (1) Field of the Invention

The present invention relates to a magnetic disc device used as a memory means for mini-computers or a micro-computers.

Conventionally, a Winchester type magnetic disc device using hard discs 3.5 inches in diameter has been used as a memory means for a mini-computers or a micro-computers. Such a magnetic disc devices must have a high memory density without any enlargement of the size thereof, to ensure that it is compatible with other conventional devices. Therefore, an improved magnetic disc device has been developed, which has a high memory density enriched by increasing the number of magnetic discs.

(2) Description of the Related Art

A conventional magnetic head of a known magnetic disc device is illustrated in FIGS. 13a and 13b. A magnetic head 5 includes coil lead wires 5a which are drawn upward in the direction opposite to a slider surface 5b. With this structure, the lead wires 5a may sometimes come into contact with a disc surface disposed above the magnetic head or another magnetic head disposed above and opposing this magnetic head 5 which will cause a short circuit or an instability of the head when in operation the head is separated from the disc surface and floating thereon.

Also, the conventional magnetic disc device includes a head actuator having a pivot 6f, as shown in FIG. 14. The pivot 6f has a plurality of head arms 6e which are secured to an outer sleeve 10. The outer sleeve 10 is installed on a stationary shaft 12 through two roller bearings 11 and 11'. The shaft 12 is disposed on a seat 12a for vertical positioning when secured to the base 1 through a screw. The diameter of the seat 12a is approximately the same as that of the outer sleeve 10. Therefore, the space corresponding to the height H of the seat 12a is wasted, thus causing an unnecessary enlarging of the case of the magnetic disc device.

A magnetic device has a record medium on which information data is recorded and a magnetic head for reading the information from that medium. The magnetic head is disposed in such a manner that it faces the recording area of the record medium, to transmit 10 information data between the record medium and a read/write device.

When a magnetic disc is used as the magnetic medium, the head is attached to a head arm which carries the head and positions it at a desired track in the recording area of the magnetic disc. Therefore, in order to achieve an accurate positioning of the head at a high speed, it is necessary to reduce the weight of the head construction, including the head arm, to minimize the inertial force thereof.

A known magnetic head structure is illustrated in FIG. 12. A head 33 is supported at an end of a gimbal 32 which is secured to a head arm 31. Information data is transmitted between the head and a read/write device through a lead wire 34. A springy clip 35 made of plastic is attached to the head arm 31 to hold the lead wire 34 between the head arm 31 and the clip 35 along the head arm side edge.

With the above-mentioned magnetic head structure of the prior art, the head arm 31 becomes heavy, since the clip 35 is used for holding the lead wire 34, thus opposing the requirement for reducing the weight of the head arm structure. Also, the gap between the discs must be wide enough to accommodate the clips 35 therebetween, thus preventing a reduction of the height of the magnetic device.

SUMMARY OF THE INVENTION

Accordingly, an object of the present invention is to provide a magnetic disc device in which the problem of a short circuit of the lead wires or an instability of the magnetic head when in operation separated from the disc surface and floating thereon is eliminated.

Another object of the present invention is to provide a magnetic disc device which eliminates unnecessary dead space due to the pivot seat of the head actuator, thus realizing a more compact device.

A further object of the present invention is to provide a magnetic disc device having a light weight head structure.

The present invention especially realizes a half-height type magnetic disc device having a swing type actuator and four magnetic discs housed therein.

The height dimension of the magnetic disc device is commercially standardized and a full-height type magnetic disc device is marketed. Also, a half-height type magnetic disc device has been developed to realize a small size magnetic disc device which is compatible with the full-height type magnetic disc device. This type is advantageous from the standpoint of space saving since the height is one half that of the full-height type magnetic disc device.

On the other hand, when the capacity of the magnetic disc device is to be increased using an ordinary interface circuit, it is desirable to double the number of the discs, from the standpoint of easy installation of a new magnetic disc device having an increased capacity in place of an old device. It is relatively easy to exchange an old device with a new one and/or simultaneously use a new device with an old one through an ordinary interface circuit. Therefore, a two-disc magnetic disc device was developed as an improvement on a one-disc magnetic disc device. Subsequently, a magnetic disc device comprising four discs has been developed as an improvement on the two-disc device.

The present invention makes it possible to house four discs in a half-height type magnetic disc device, which could not be realized by the known devices, since four discs could not previously be stacked in the shortened half-height type device housing of the known structures.

In accordance with the present invention, there is provided a half-height type magnetic disc device having, a base; four magnetic discs disposed one above the other on the base, five head arms rotatable about a pivot for a seeking motion on both surfaces of each disc, eight magnetic heads each attached to an end of the head arm facing a surface of each disc, a rotational drive means for swinging the head arms, a main printed circuit board disposed on a rear side of the base, and a cover which covers an upper surface of the base.

Preferably, the magnetic head includes a slider and a core disposed at a back side of the slider for winding a coil thereon, a lead wire of the coil being taken out from an intermediate position of the core along the height thereof.

The pivot preferably has: an outer sleeve to which the five head arms are secured; a stationary shaft secured on the base and on which the outer sleeve is rotatably installed, and a seat on which the shaft is supported on the base, the seat having an inclined periphery and the outer sleeve having a lower inner annular edge inclined to face the inclined periphery of the seat.

Preferably, each of the head arms has a groove formed thereon, the lead wire being fitted and held in the groove.

BRIEF DESCRIPTION OF THE DRAWINGS

FIG. 2 is a vertical sectional view of the magnetic disc device according to the present invention;

FIG. 3 is a perspective view of a head arm drive means of the magnetic disc device according to the present invention;

FIG. 4 is a partial exploded view of a head support structure of the magnetic disc device according to the present invention;

FIG. 8(a) is a plan view of another example of a head arm according to the present invention;

FIG. 8(b) is a sectional view taken along line A–A' of FIG. 8(a);

DETAILED DESCRIPTION OF THE PREFERRED EMBODIMENTS

Figure 5:
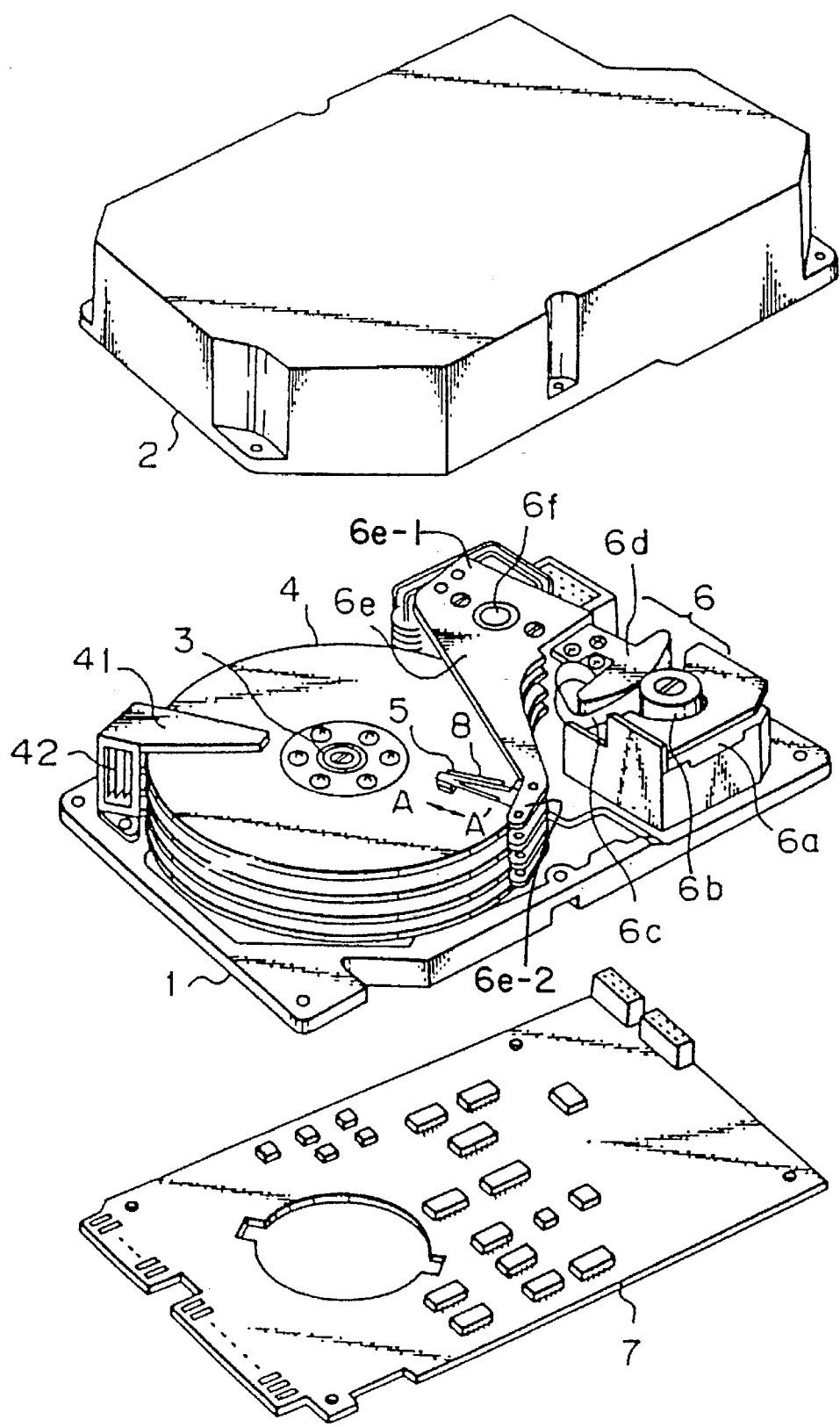
FIG. 5 is an exploded view of the magnetic disc device according to the present invention.
Figure 6:
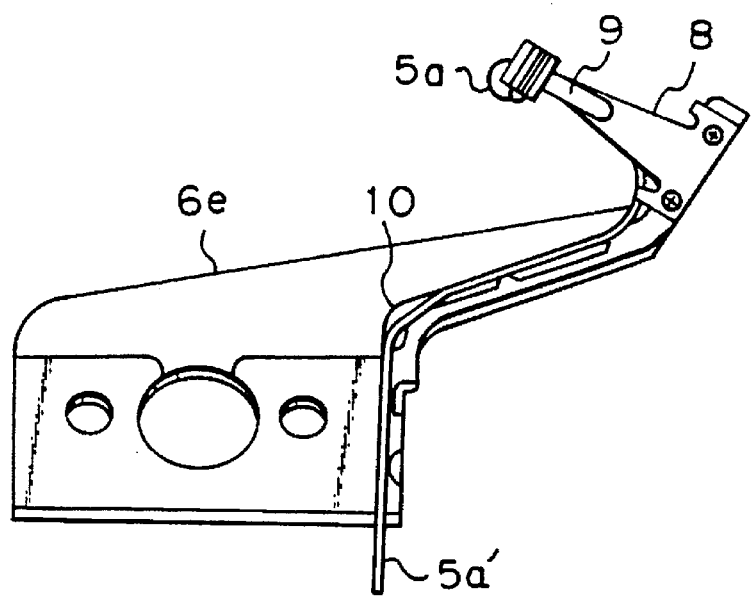
FIG. 6 is a plan view of a head arm of the magnetic disc device according to the present invention.

FIG. 5 is an exploded perspective view of a magnetic disc device according to the present invention. The magnetic disc device includes a housing formed by a base 1 and a cover 2, four magnetic discs 4 secured to a spindle 3, eight magnetic heads 5 for magnetic read/write operations at the upper and lower surfaces of each magnetic disc 4, and a head actuator 6 for swinging the magnetic heads 5 in the direction of the arrow AA' on the magnetic disc surfaces. The head actuator 6 includes a drive motor 6a, a capstan 6b, a steel belt 6c, a sector 6d, head arms 6e, and a pivot 6f. Below the base 1 are disposed a spindle drive motor (not shown), a printed circuit board for driving the spindle drive motor (not shown), and a main printed circuit board 7 mounting a read/write circuit for reading data from and writing data on the magnetic discs. Each magnetic head 5 is attached to a head arm 6e through a gimbal spring and a load spring 8.

Figure 1:
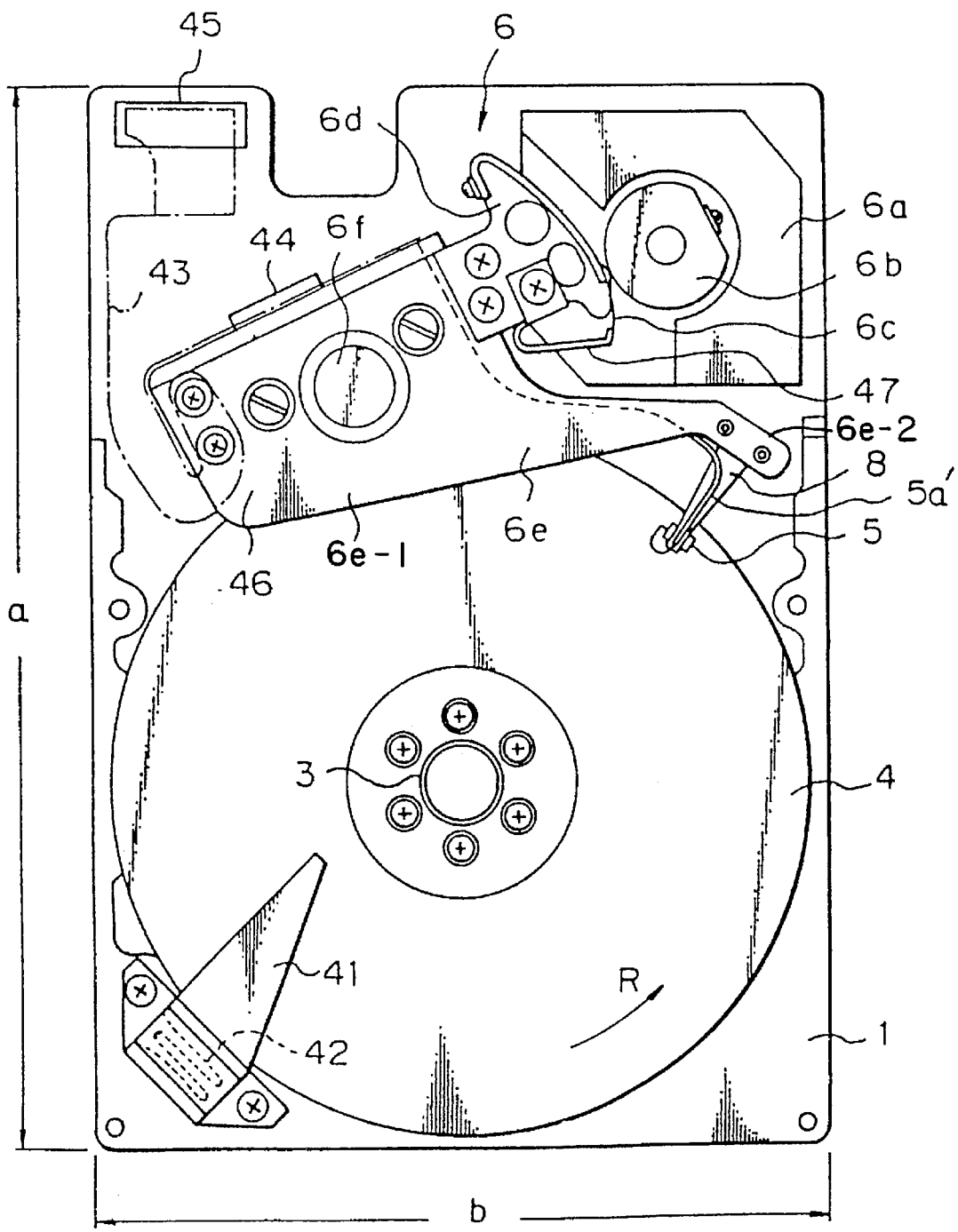
FIG. 1 is a plan view of a magnetic disc device according to the present invention, with the cover removed.

The magnetic disc device illustrated in FIG. 1 is seen from the upper side thereof; with the cover removed, FIG. 2 shows a vertical section thereof. The magnetic disc device is of a half-height type having a commercially standardized outer shape dimension. That is, the disc diameter is 96 mm, the longitudinal length a=146±0.5 mm, the lateral length b=101.6±0.5 mm, and the height c=41.3±0.3 mm. A bottom plate 30 (FIG. 2) for covering the main printed circuit board 7 is disposed below the base 1 and secured thereto together with the main printed circuit board 7 by screws. The height c is the dimension between the lowest surface of the bottom plate 30 and the top surface of the cover 2. The gap d between the adjacent magnetic discs 4 is 4.5 mm, and the thickness t of each magnetic disc 4 is 1.27 mm. Five head arms 6e are arranged to conduct a seeking motion on both surfaces of the four magnetic discs 4, as shown in FIG. 2. The thickness of the two uppermost and lowermost head arms is 2.0 mm, and the thickness of the three intermediate head arms is 2.8 mm. The tip of each head arm 6e is thinned to 1.154 mm to attach the load spring 8. The gap between the lower surface of the lowermost magnetic disc 4 and the upper surface of the base 1 is 3.5 mm. Also, as described later, the gap w (FIG. 11) between the lower surface of the lowermost head arm 6e at the pivot portion and the upper surface of the base 1 is 0.5 mm.

The magnetic discs 4 rotate in the direction of the arrow R (FIG. 1). A baffle plate 41 is disposed corresponding to each of the four magnetic discs 4 facing the upper surface thereof. A filter 42 is incorporated in each baffle plate 41 to remove dust particles from the disc surface.

The magnetic head 5 is connected to a flexible printed circuit board 43 (shown by a broken line) bonded behind the head arm 6e through a lead wire 5a'. A head IC (preamplifier) 44 is mounted on the flexible printed circuit board 43 behind the head arm 6e. The flexible printed circuit board 43 is connected to a connector 45 disposed at a corner of the base 1. The flexible printed circuit board 43 is loose and can be folded back and forth at the rear end of the head arm 6e to allow free movement without impeding the swing motion of the head arm 6e. The connector 45 is connected to the main printed circuit board 7 (FIG. 5) disposed under the base 1.

The head arm 6e has a counter weight portion 46 mounted at the side opposite the magnetic head attaching end thereof with respect to the pivot 6f. With the provision of the counter weight portion 46, it is possible to balance the weight of the head arm 6e with respect to the pivot 6f, thus achieving a smooth and stable swing motion of the head arm 6e irrespective of the attitude of the device.

The swing actuator structure of the head arm 6e is illustrated in detail in FIG. 3. The head arm 6e is affixed at a first end 6e-1 to, and is rotatable about the pivot 6f, as shown by the arrow Q, and a mushroom-shaped sector 6d is secured to the head arm 6e. A capstan 6b is disposed facing and adjacent to a head portion of the sector 6d. The capstan 6b is rotatable about a shaft 48, as shown by the arrow P, a tension spring 47 is attached to a stem portion of the sector 6d. An end of a steel belt 6c is bonded to the tension spring 47. Another steel belt 6c' is secured to the opposite side of the sector 6d. Both steel belts 6c and 6c' are wound around the capstan 6b and secured thereto at the back thereof by a screw. The steel belts may be integrally formed as one strip. With this structure, the capstan 6b is rotated as shown by the arrow P to swing the sector 6d through the steel belts 6c, 6c', thus rotating the head arm 6e as shown by the arrow Q about the pivot 6f. Numeral 13 designates a groove for holding the lead cable 5a', as described later in detail.

The structure for supporting the magnetic head 5 is illustrated in detail in FIG. 4. The load spring 8 is made from a leaf spring of an elongated and generally planar configuration, having a root portion 8a at a first end thereof and lateral flanges 8' and 8" extending to a second end 8b thereof. A gimbal 9 also made from a leaf spring is bonded to the second end 8b of the load spring 8 by spot welding. A support piece 9a is formed by cutting the inner area of the gimbal 9. The support piece 9a is bonded to an upper recess surface 50 of the magnetic head 5. The magnetic head 5 has a core 5d on which a coil (not shown) is wound and the coil lead 5a is taken out therefrom and extends along a path, as described in detail later. The coil lead 5a is covered by a protecting outer tube to form a lead cable 5a' emanating from the end portion of the load spring 8. The root portion 8a of the load spring 8 at the first end thereof is secured to the free, second end 6e-2 (see FIG. 1) of the head arm 6e (FIG. 5); a generally planar interface is formed therebetween. As shown in FIGS. 1, 4, 5 and 10, coil lead 5a extends from the intermediate portion of a sidewall of the head 5 and is connected to lead cable 5a'. Lead cable 5a', in turn, extends in a path along the top planar surface of load spring 8 within the height of the load spring 8, defined by the lateral flanges 8' and 8", to a point outside of the magnetic disc and then is held in grove 13 formed within the height (i.e., thickness) of head arm 6e, as measured from the bottom planar surface thereof.

A magnetic head coil structure according to the present invention is illustrated in FIGS. 10(a) and 10(b), wherein FIG. 10(c) is a plan view and FIG. 10(b) is a front view. In the drawings, the magnetic head 5 is formed as a slider having a slider surface 5b and a core 5d on which a coil 5e is wound. Reference 5a designates a coil lead, reference 5c designates an opening for forming a gap, and references 5f and 9 designate a gap and a gimbal, respectively. The gimbal 9 is bonded to the magnetic head 5 at the hatched portion thereof.

Figure 13A:
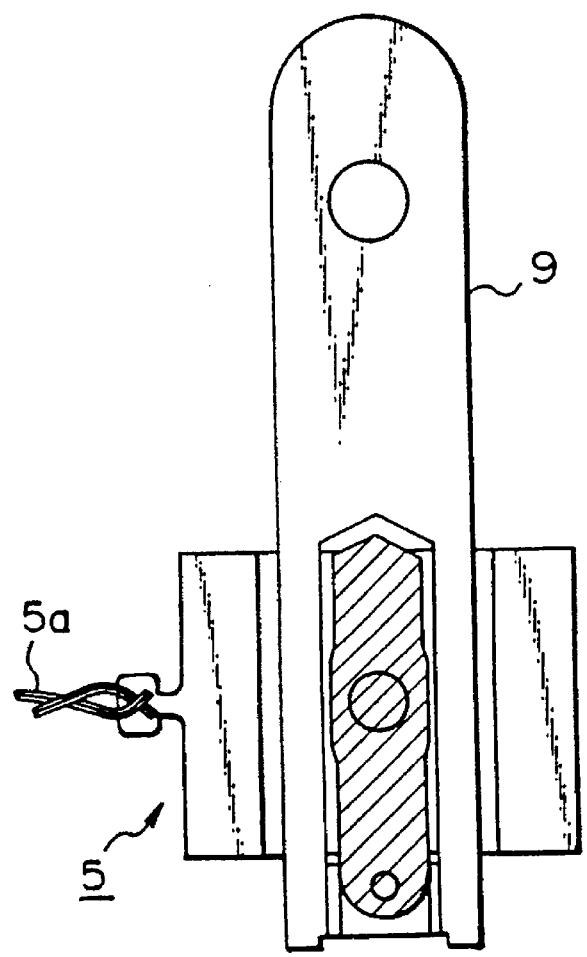
FIG. 13(a) is a plan view of a known magnetic head.
Figure 13B:
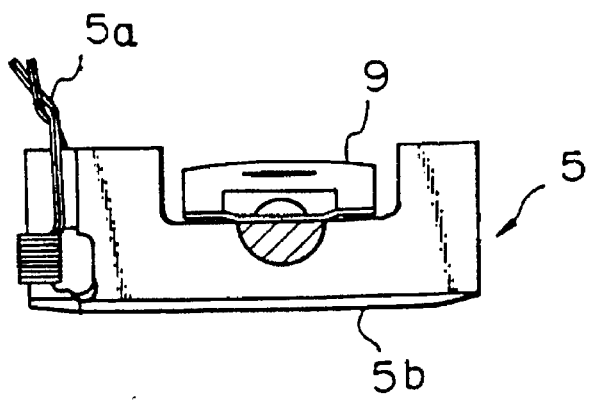
FIG. 13(b) is a front view of the FIG. 13(a) magnetic head.

As can be seen from the drawings, the lead wire 5a of the coil 5e of the magnetic head 5 is taken from the lateral side of the opening 5c. That is, the coil lead 5a is taken from the intermediate portion of its core 5d along the height thereof instead of the top of the core 5d as in the known structure of FIG. 13. Thus, the coil lead 5a is connected to the lead wire cable 5a' within the height $H_1$ shown in FIG. 10b.

The height $H_1$ of this embodiment can be shortened and the distance between the magnetic discs can be reduced without allowing the lead to come into contact with the disc surface, since the lead wire 5a is taken from the lateral side of the opening 5c in parallel with the slider surface 5b.

The lead wire 5a furthermore is disposed in a path along the planar surface of the load spring 8 and the head arm 6e and then is connected to an amplifier attached behind the head arm. Preferably, the lead wire cable 5a' is fitted and held in the groove 13, comprising part of the path formed in the head arm 6e from the lower planar surface thereof, to reliably hold the cable therein and avoid contact between the cable and the disc surface. As seen in FIG. 4, the cross-sectional, or transverse, dimension of the lead cable 5a', and thus the corresponding dimension of the path through which the cable passes, is less than the thickness of the spring 8 as defined by the lateral flanges 8' and 8" and likewise less than the depth of the groove 13, measured from the bottom surface of head arm 6e and thus from the planar interface with the root portion 8a of the load spring 8.

As mentioned above, in accordance with the present invention, it is possible to reduce the distance between the magnetic discs with a simple structure without allowing the lead wire to come into contact with the magnetic disc surface, thus realizing a compact arrangement of the magnetic discs which is practically very useful.

Figure 11:
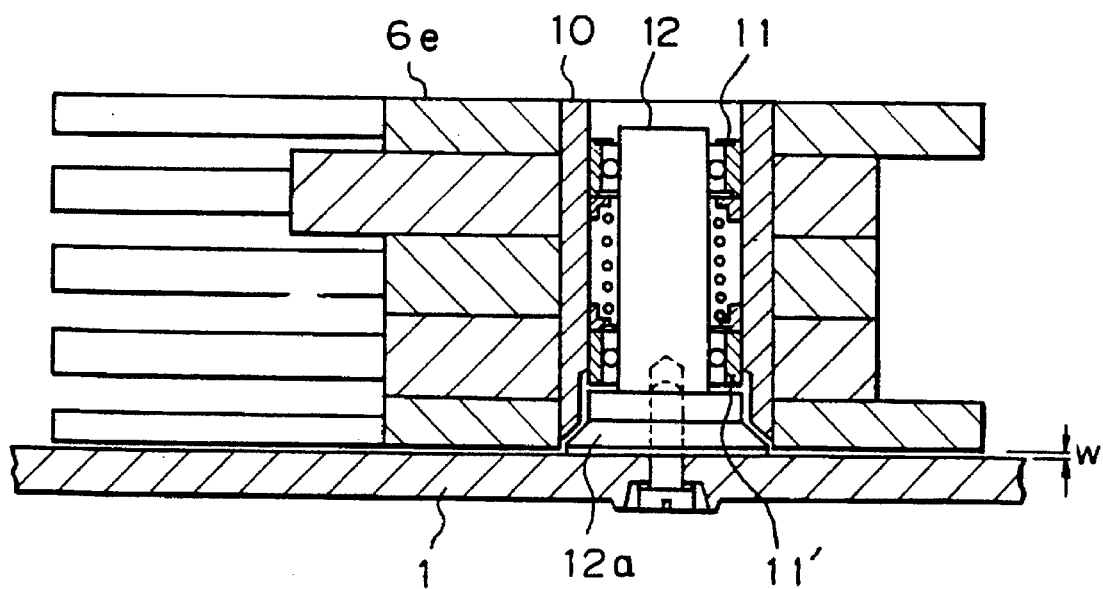
FIG. 11 is a sectional view of a pivot of the magnetic disc device according to the present invention.
Figure 12:
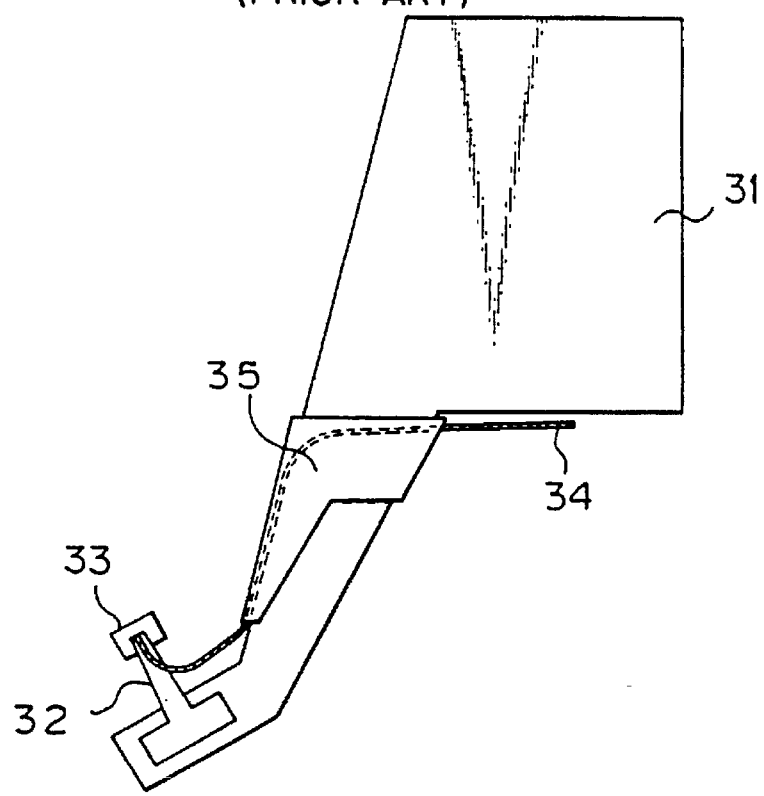
FIG. 12 is a plan view of a known magnetic head arm.

A pivot structure of the head arm according to the present invention is illustrated in FIG. 11. In the drawing, numeral 1 designates a base, 6e designates a head arm, 10 designates an outer sleeve, 11 and 11' designate roller bearings, and 12 designates a stationary shaft.

As shown in the drawing, this embodiment of the pivot structure includes the outer sleeve 10, which supports a plurality of head arms 6e simultaneously, and the stationary shaft 12 which rotatably supports the outer sleeve 10 thereon through two roller bearings 11 and 11'. The stationary shaft 12 is placed on a seat 12a having a diameter which is approximately the same as that of the outer sleeve 10, to ensure the verticality of the shaft which is secured to the base 1 by a screw, similar to the known structure of FIG. 14. A primary feature of this embodiment resides in the structure wherein the inner peripheral edge of the lower end of the outer sleeve 10 is inclined and the outer periphery of the seat 12a of the shaft 12 is also inclined in a direction facing the inner inclined lower end of the outer sleeve 10.

Figure 14:
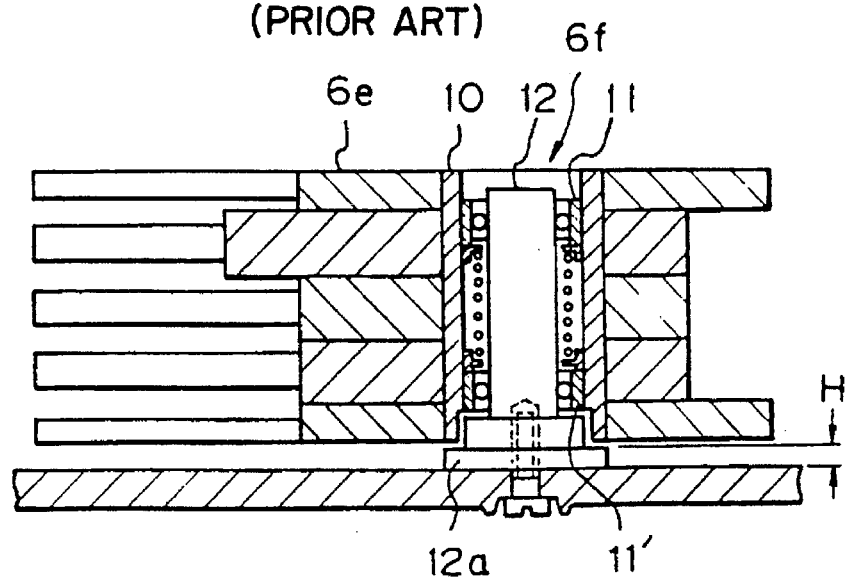
FIG. 14 is a sectional view of a pivot of a known magnetic disc device.

With such a structure, the seat 12a is arranged to fit into the inclined lower inner edge of the outer sleeve 10, thus eliminating the unnecessary dead space corresponding to the height H of the seat as described with reference to FIG. 14 of the known structure. Therefore, it is possible to reduce the height of the magnetic disc device.

As mentioned above, in accordance with the present invention, it is possible to eliminate the dead space for the pivot seat, with a very simple structure, thus realizing a small-sized magnetic disc device which has practical uses. This is because the distance w (FIG. 11) between the lower surface of the head arm 6e and the upper surface of the base 1 is considerably reduced.

A coil lead wire cable arrangement according to the present invention is described hereinafter with reference to FIGS. 7 to 9.

Figure 7:
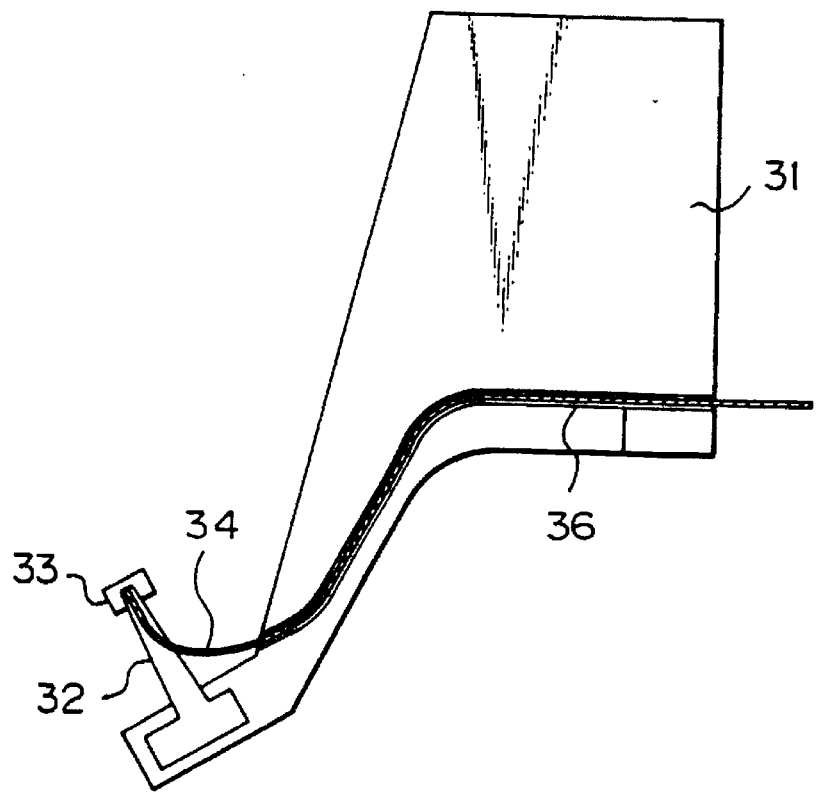
FIG. 7 is a plan view of a head arm of the magnetic disc device according to the present invention.

FIG. 7 is an explanatory view of the principle of the arrangement of the present invention. In FIG. 7, numeral 36 designates a cable holding means, which is a groove formed along a cable pass. The cable 34 is fitted into the groove.

The cable 34 is fitted and held in the groove of the holding means 36 formed in the head arm 31. Therefore, it is unnecessary to use a special instrument for holding the cable like a clip to hold the cable, thus reducing the weight of the magnetic head structure.

An example of the cable holding arrangement according to the present invention is illustrated in FIGS. 8(a) and 8(b), wherein the same parts as shown in FIG. 7 are designated by the same numerals. FIG. 8(a) is a plan view of the arrangement and FIG. 8(b) is a sectional view along the line AA' of FIG. 8(a). A groove 37 is formed as a cable holding means along the cable pass on the head arm 31. FIG. 8(b) shows a cross section of the groove 37, which forms a rectangular recess for receiving the cable 34.

The cable 34 is held in this groove 37 by press fitting the cable into the groove. An adhesive agent may be used to firmly hold the cable 34 within the groove 37.

Figure 9B:
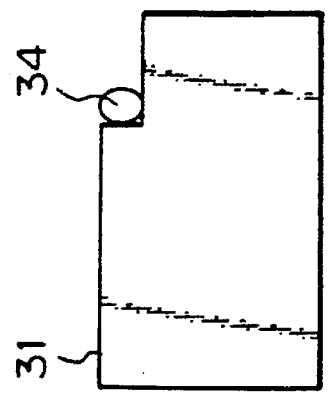
FIG. 9(b) is a sectional view taken along line B–B' of FIG. 9(a)
Figure 9C:
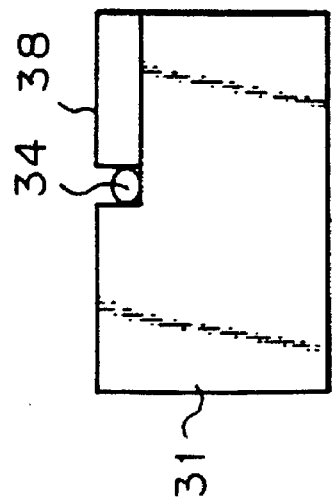
FIG. 9(c) is a sectional view taken along line C–C' of FIG. 9(a)
Figure 9A:
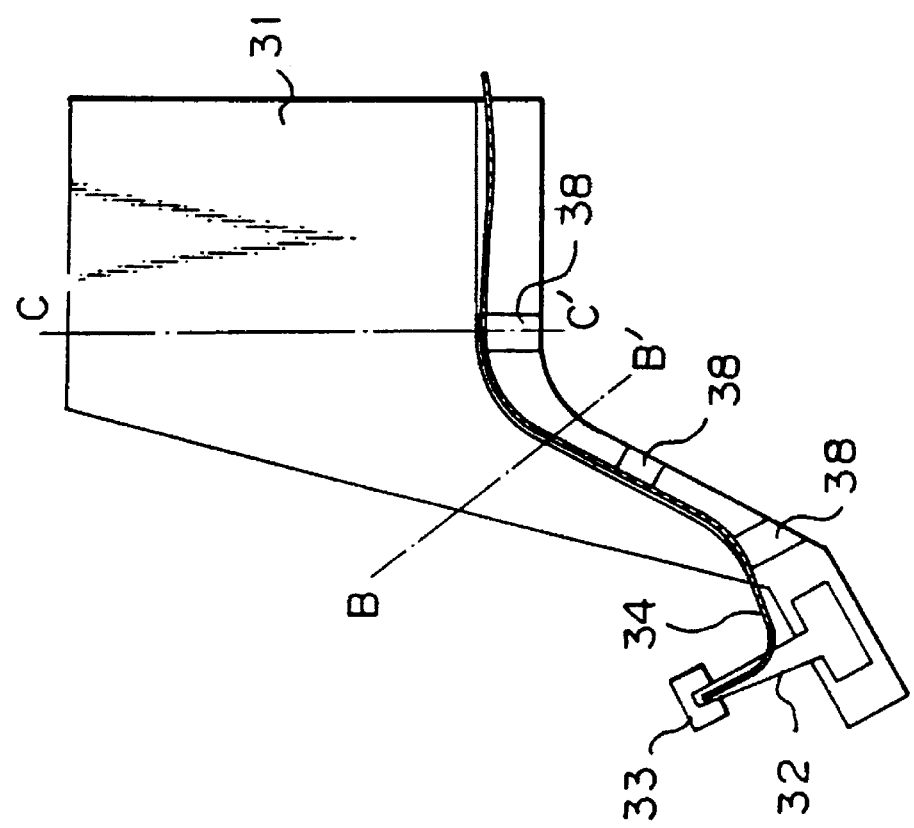
FIG. 9(a), is a plan view of another embodiment of a head arm of the present invention.
Figure 10:
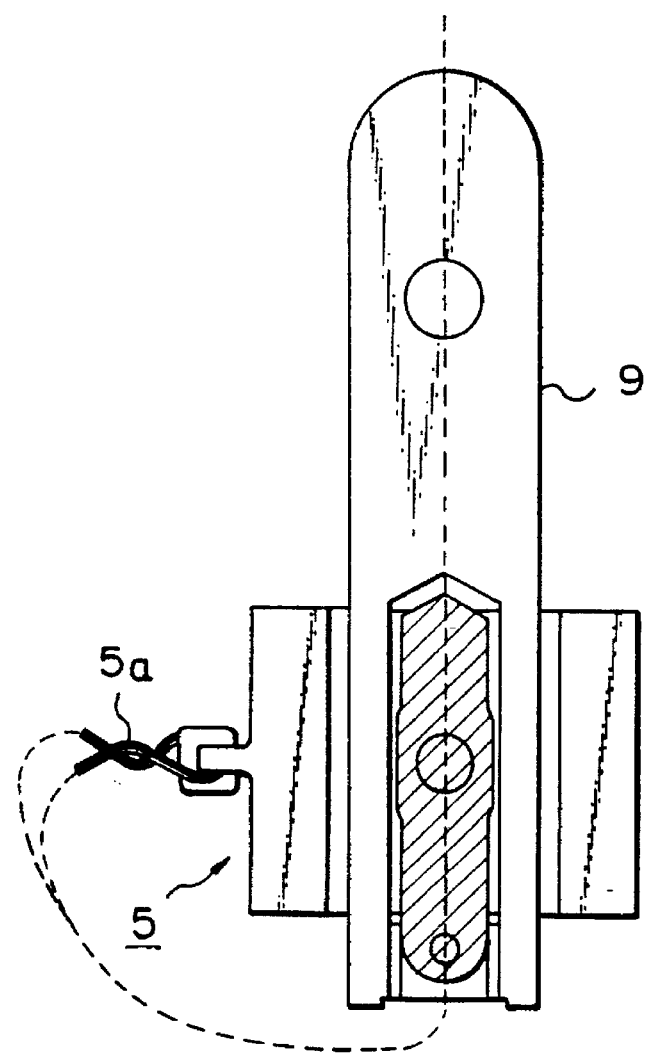
FIG. 10(a) is a plan view of an embodiment of a magnetic head of the present invention.
FIG. 10(b) is a front of the FIG. 10(a) embodiment.
Figure 10:
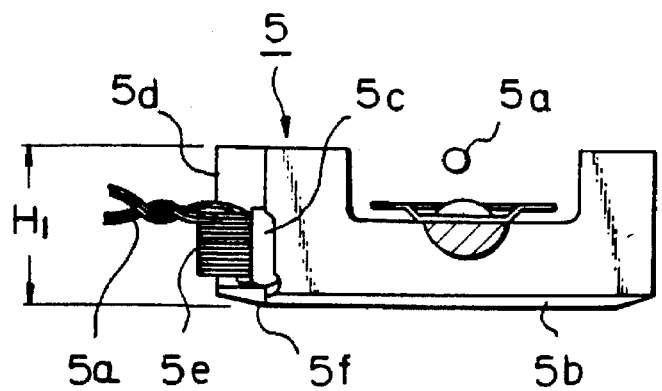

Another example of the cable holding arrangement according to the present invention is illustrated in FIGS. 9(a), 9(b) and 9(c). A step is formed along the cable pass on the head arm 31, as shown in FIG. 9(b) which shows a cross section along the line BB' of the head arm 31 of FIG. 9(a) As best shown in FIG. 9(b), the step has a bottom surface which forms a first surface parallel to the surfaces of the magnetic disks and a side surface which forms a second surface perpendicular to the first surface. A plurality of holder projections 38 are disposed along the step of the cable pass to partly form a groove-like portion, as shown in FIG. 9(c) which is a cross section along the line CC' of the head arm 31 of FIG. 9(a). The cable 34 is held in this groove-like portion. As result, in the present invention, the total thickness or height of the magnetic head 5, the head arm 6e and the structure for supporting the magnetic head can be further reduced.

As mentioned above, the magnetic head structure according to the present invention includes a groove as a lead wire holding means formed along the cable pass on the head arm, which makes it unnecessary to use a special cable holding instrument means, thus enabling a reduction of the weight of the magnetic head.

We claim:

1. A magnetic disc device comprising:

a housing;

a magnetic disc having a periphery and disposed in said housing;

a magnetic head facing a corresponding surface of the disc and comprising a slider having a slider surface parallel to the corresponding surface of the respective disk and a thickness defined by a height dimension of the head in a first direction perpendicular to the slider surface;

a head arm having a first end rotatably connected to a pivot and a second, free end and being rotatable about the pivot;

a drive mechanism selectively driving said head arm in rotating motion about the pivot and in seeking motion relative to the corresponding surface of the disc, a portion of said head arm including the second free end thereof moving over the corresponding surface of said magnetic disc during operation of the disc device, the head arm portion having first and second substantially planar main surfaces, parallel to each other and to the corresponding surface of said respective magnetic disc and defining a substantially uniform thickness therebetween throughout at least the head arm portion and including the second, free end thereof, and a further surface perpendicular to the first and second main surfaces;

a spring member supporting said magnetic head on said head arm, the spring member comprising a substantially planar component extending between and connecting said magnetic head to the second, free end of said head arm and having spaced, lateral edges with respective, integral lateral flanges extending from the lateral edges in the first direction, away from the respective disk, and defining a thickness of the spring member;

a lead wire having a first portion extending along a surface of the planar component of the spring member remote from the respective magnetic disk and within the thickness of the spring member and a second portion extending along the further surface of the head arm portion and disposed within the thickness of the head arm portion at least until the lead wire extends to outside the corresponding periphery of the magnetic disc; and said head arm portion further comprising means, displaced from said further surface, for holding the second portion of the lead wire by press fitting and further comprising projections spaced from the further surface and defining a groove in which the second portion of the lead wire is received and held fast by press fitting therein.

2. A magnetic disk device as recited in claim 1, wherein the groove comprises plural groove portions at spaced locations along the further surface of the head arm portion along which the second portion of the lead wire extends.

3. A magnetic disk device as recited in claim 1, wherein the groove is formed in the further surface of the head arm portion, extending thereinto transversely to the first direction.

4. A magnetic disk drive device as recited in claim 1, wherein the groove extends into the head arm portion, adjacent the further surface thereof, in the first direction.

5. A magnetic disk drive device as recited in claim 4, wherein the groove extends into the head arm portion from one of the first and second substantially planar main surfaces thereof.

6. A head arm assembly, supporting a magnetic head and driven in selective rotation for moving the magnetic head over a corresponding surface of a respective magnetic disc, comprising:

a head arm having a portion which moves over the corresponding surface of a respective magnetic disk and is of a substantially uniform thickness defined by spaced, substantially planar first and second main surfaces, the head arm being driven in selective rotation at a first end and having a second end defining a connecting surface;

a spring element having a substantially planar portion with first and second spaced edges and first and second flanges integral with the first and second spaced edges, respectively, and extending transversely from the substantially planar portion and defining a thickness of the spring element, a first end of the substantially planar portion being engaged on the planar connecting surface of the head arm and a second end of the substantially planar portion defining a magnetic head mounting surface;

a signal wire extending from the magnetic head and having a first portion extending along a surface of the planar portion of the spring member and secured to the spring member so as to be held within the thickness of the spring member and a second portion extending along the head arm portion and disposed between the upper and lower main surfaces thereof and thereby within the substantially uniform thickness of the head arm portion; and a signal wire holder for holding said signal wire within the substantially uniform thickness of the head arm portion and comprising a further surface the head arm portion and a projection, spaced from the further surface and defining a groove in which a corresponding portion of the second portion of the signal wire is received and is held therein by press fitting.

7. A magnetic disk device as recited in claim 6, further comprising plural wire holders at spaced locations of the head arm portion.

8. A magnetic disk device as recited in claim 6, wherein the groove is formed in the further surface of the head arm portion, extending thereinto transversely to the further surface.

9. A magnetic disk drive device as recited in claim 6, wherein the groove extends into the head arm portion, adjacent the further surface thereof and transversely to the first and second main surfaces.

10. A magnetic disk drive device as recited in claim 6, wherein the groove extends into the head arm portion from one of the first and second substantially planar main surfaces thereof.

11. A magnetic disc device comprising:

a housing;

a printed circuit board disposed in said housing;

a plurality of magnetic discs disposed in said housing;

a plurality of magnetic heads, each magnetic head facing a corresponding surface of a respective disc and comprising a slider having a slider surface parallel to the corresponding surface of the respective disk and a thickness defined by a height dimension of the head in a first direction, perpendicular to the slider surface;

a plurality of head arms having respective first ends rotatably connected to a pivot and respective second, free ends and being rotatable about the pivot;

a drive mechanism selectively driving said head arms in swinging, rotating motion about the pivot and in seeking motion relative to the corresponding surfaces of the respective discs, respective head arm portions including the second free ends of said head arms moving over the corresponding surfaces of said respective discs during operation of the magnetic disc device, each head arm portion having first and second substantially planar main surfaces, transverse to the first direction and parallel to each other and defining a substantially uniform thickness of the head arm portion including the second, free end thereof in the first direction perpendicular to the surface of said respective disc, and a further surface perpendicular to the first and second main surfaces;

a support structure supporting each said magnetic head on a respective said head arm and comprising a spring member attached at a first end to the second, free end of the respective said head arm and a second end attached to and supporting said magnetic head, each said spring member having a thickness in the first direction less than the substantially uniform thickness of said respective head arm portion;

a plurality of coil windings fixed respectively to said plurality of magnetic heads, each said coil winding being located within a height of said respective magnetic head;

a plurality of lead wires connected respectively to said plurality of coil windings and extending beyond the corresponding peripheries of the respective plurality of disks to said printed circuit board and connected thereto;

a groove, formed in the head arm portion, having a dimension in the first direction less than the substantially uniform thickness of the head arm portion; and each said lead wire being connected to and extending along a surface of the spring member and being received in and held by press-fitting within the groove and extending along said respective hear arm portion, and said lead wire being located within the respective thicknesses of said respective magnetic head, said respective spring member and said respective head arm, until said lead wire extends to beyond the corresponding periphery of said respective magnetic disc.

12. A magnetic disc device claimed in claim 11, wherein each said magnetic head comprises a core on which said respective coil winding is wound.

13. A magnetic disc device claimed in claim 11, wherein said drive mechanism comprises a stepper motor.

14. A magnetic disk device as recited in claim 11, wherein the groove comprises plural groove portions at spaced locations of the head arm portion along a path of the lead wire.

15. A magnetic disk device as recited in claim 11, wherein the groove is formed in the further surface of the head arm portion, extending thereinto transversely to the first direction.

16. A magnetic disk drive device as recited in claim 11, wherein the groove extends into the head arm portion adjacent the further surface thereof, extending thereinto in the first direction.

17. A magnetic disk drive device as recited in claim 16, wherein the groove extends into the head arm portion from one of the first and second substantially planar main surfaces thereof.

18. A head arm assembly supporting a magnetic head and driven in selective rotation for moving the magnetic head over a corresponding surface of a respective magnetic disc, comprising:

a head arm having a portion which moves over the corresponding surface of a respective magnetic disk and is of a substantially uniform thickness, defined by substantially planar first and second main surfaces thereof, and having a further surface transverse to the first and second main surfaces, the head arm being driven in selective rotation at a first end and having a second end defining a connecting surface;

a spring element of an elongated and substantially planar configuration and having first and second main surfaces, a first end portion of the first main surface being engaged on the planar connecting surface of the head arm and a second end portion of the second main surface thereof defining a mounting surface for a magnetic head and having respective flanges on first and second edges; and a signal wire, extending from the magnetic head and onto the first main surface of the spring member and through a first path on and along the first main surface of the spring member and through a further path along the transverse surface of the head arm, the further path defined by a groove in the head arm portion in which the signal wire is received and secured therein by press fitting, the first path having a thickness dimension relative to the first main surface of the spring element no greater than the thickness of the head arm and the further path having a thickness no greater than the thickness of the head arm portion.

19. A head arm assembly as recited in claim 18 wherein the spring element further comprises first and second spaced edges respectively extending between the first and second end portions and having corresponding first and second integral flanges extending at substantially a right angle from the first main surface in a direction remote from the corresponding surface of the respective disk.

20. A magnetic disk device as recited in claim 18, wherein the groove comprises plural groove portions at spaced locations of the head arm portion along the further path of the lead wire.

21. A magnetic disk device as recited in claim 18, wherein the groove is formed in the further surface of the head arm portion, extending thereinto transversely to the further surface.

22. A magnetic disk drive device as recited in claim 18, wherein the groove extends into the head arm portion, adjacent the further surface thereof and transversely to the first & second main surfaces.

23. A magnetic disk drive device as recited in claim 22, wherein the groove extends into the head arm portion from one of the first and second substantially planar main surfaces thereof.

24. A magnetic disc device comprising:
a housing;
a printed circuit board disposed in said housing;
a plurality of magnetic discs disposed in said housing;
a plurality of magnetic heads, each magnetic head facing a corresponding surface of a respective disc and comprising a slider having a slider surface parallel to the corresponding disc surface and a thickness defined by a height dimension of the magnetic head in a first direction, perpendicular to the slider surface;
a plurality of head arms, each having a first end connected rotatably to a pivot and a second, free end and being rotatable about the pivot, driven in seeking motion relative to a corresponding surface of a respective magnetic disc, respective portions including the second free ends of said head arms moving over the corresponding surfaces of said respective magnetic discs during operation of the disc device, each of said head arms having first and second substantially planar main surfaces, parallel to each other and to the surface of said respective magnetic disc and defining the thickness thereof throughout the portion including the second free end thereof, and a further surface perpendicular to the first and second main surfaces;
a drive mechanism selectively driving said head arms in swinging, rotating motion about the pivot;
a support structure supporting each said magnetic head on a respective said head arm and comprising a spring member attaching said magnetic head to the second end Of the respective one of said head arms;
a coil winding fixed to each said magnetic head, said coil winding being located within a height of said magnetic head;
a lead wire connected to said coil winding to communicate a signal between said printed circuit board and said coil winding; and
projections, connected to the further surface of said head arm, holding said lead wire by press-fitting, said projections provided within a space between the first and second substantially planar main surfaces of said head arm.

25. A magnetic disc device according to claim 24, said spring member having a first end attached to the second, free end of the respective said head arm and a second end attached to and supporting said magnetic head and having a thickness less than the substantially uniform thickness of the head arm.

26. A magnetic disk device as recited in claim 24, wherein the groove comprises plural groove portions at spaced locations of the head arm portion along a path of the lead wire.

27. A magnetic disk device as recited in claim 24, wherein the groove is formed in the further surface of the head arm portion, extending thereinto transversely to the first direction.

28. A magnetic disk drive device as recited in claim 24, wherein the groove is disposed in the head arm portion, adjacent the further surface thereof and extending thereinto in the first direction.

29. A magnetic disk drive device as recited in claim 28, wherein the groove extends into the head arm portion from one of the first and second substantially planar main surfaces thereof.

30. A magnetic disc device comprising:
a housing;
a plurality of magnetic discs having corresponding peripheries and disposed in said housing;
a plurality of magnetic heads, each magnetic head facing a corresponding surface of a respective disc and comprising a slider having a slider surface parallel to the corresponding surface of the respective disk and a thickness defined by a height dimension of the head in a first direction, perpendicular to the slider surface;
a plurality of head arms and respectively associated spring members disposed in stacked relationship and supporting the plurality of magnetic heads, respectively, each spring member attaching said respective magnetic head to an end of said respective head arm and comprising a substantially planar component extending between and attaching said respective magnetic head to an end of said respective head arm and having spaced, lateral edges with respective, integral lateral flanges extending from the respective edges in the first direction and away from the respective disk and defining a thickness of the spring member;
each of said head arms having first and second main surfaces parallel to the surface of said respective magnetic disc and a third surface perpendicular to the first and second main surfaces and being rotatable about a common pivot, a corresponding portion of each head arm and the attached, respective spring member being movable relatively to and over the corresponding surface of the respective magnetic disc thereby producing seeking motion of the respective magnetic head relative to the corresponding surface of the respective magnetic disc, each said head arm portion and respectively associated spring member lying between first and second parallel planes spaced apart by a distance in the first direction defined by the substantially uniform thickness of said head arm portion and the planar component of said respective spring member;
a drive mechanism selectively driving said head arms in swinging, rotating motion about the common pivot;
a plurality of coil windings fixed respectively to said plurality of magnetic heads, each said coil winding being located within the height dimension of said respective magnetic head;
lead wires connected to respective said coil windings and extending therefrom to beyond the corresponding peripheries of said respective magnetic disks; and
each lead wire being received on and extending along a surface of the planar component of the spring member remote from the respective magnetic disk and within the thickness of the spring member and within a groove formed in the head arm portion, the groove having a dimension in the first direction less than the substantially uniform thickness of the head arm portion, and the wire being held firmly within the groove by press fitting of the wire therein and such that each said lead wire extends to outside the periphery of said respective magnetic disc, within the respective thicknesses of said magnetic head, said spring member, and said head arm portion.

31. A magnetic disc device claimed in claim 30, wherein said magnetic head comprises a core on which said coil winding is wound.

32. A magnetic disc device claimed in claim 30, wherein said drive means comprises a stepper motor.

33. A magnetic disk drive device which stacks therein plural magnetic disks, having circular peripheries, in alignment with a common axis of rotation and with corresponding planar surfaces thereof in parallel, spaced relationship and which drives the plural magnetic disks in rotation about the axis of rotation, comprising:

plural head arms, respectively related to the plural magnetic disks, disposed in parallel, spaced relationship and rotatably mounted at commonly disposed first ends thereof to a pivot for rotation about the pivot and thereby swinging movement of respective portions of the plural head arms interiorally of the peripheries of, and relatively to and over the corresponding surfaces of, the respectively related magnetic disks, each head arm portion including a second, free end and having upper and lower substantially planar surfaces defining therebetween a substantially uniform thickness of the head arm portion and a surface transverse to the upper and lower substantially planar surfaces thereof;

plural magnetic heads;

plural spring members respectively associated with the plural magnetic heads and plural head arms, each spring member having an elongated, substantially planar surface extending between first and second ends thereof and being attached at the first end thereof to, and extending from, the second, free end of the respectively associated head arm in substantially parallel relationship to the upper and lower substantially planar surfaces thereof and the respectively associated magnetic head being attached to the second end of the spring member; and each magnetic head having a lead wire extending therefrom and through a path which is contiguous to and passes along the elongated, substantially planar surface of the spring member and along the transverse surface of the head arm portion to beyond the corresponding periphery of the respectively related magnetic disk, the head arm portion further comprising a groove formed therein, perpendicular to the transverse surface and defining the path of the lead wire along the transverse surface of the head arm portion, the lead wire being received and held by press fitting in the groove and the groove having a thickness which is less than the thickness of the head arm portion.

* * * * *

UNITED STATES PATENT AND TRADEMARK OFFICE
CERTIFICATE OF CORRECTION

PATENT NO. : 5,646,800
DATED : July 8, 1997
INVENTOR(S) : MIHARA et al.

It is certified that error appears in the above-identified patent and that said Letters Patent is hereby corrected as shown below:

Col. 1,   line 20, delete "a" (second occurrence);
          line 24, delete "a" (both occurrences);
          line 59, delete "10".

Col. 2,   line 59, change "having, a base;" to --having a base,--.

Col. 3,   line 5, change "has:" to --has--;
          line 6, change "secured;" to 
          line 23, after "partial" insert --,--.

Col. 9,   line 16 (Claim 11, line 4), after "housing" insert --and housing corresponding peripheries--.

Col. 11,  line 41 (Claim 24, line 30), change "Of" to --of--.

Signed and Sealed this

Third Day of February, 1998

Attest:

BRUCE LEHMAN

Attesting Officer     Commissioner of Patents and Trademarks